(12) United States Patent
Al-Alusi

(10) Patent No.: US 11,554,868 B2
(45) Date of Patent: Jan. 17, 2023

(54) THREE DIMENSIONAL PINCHED AIRFLOW NOZZLE AND METHODS FOR USE THEREOF

(71) Applicant: The Boeing Company, Chicago, IL (US)

(72) Inventor: Thamir R. Al-Alusi, Everett, WA (US)

(73) Assignee: The Boeing Company, Chicago, IL (US)

(*) Notice: Subject to any disclaimer, the term of this patent is extended or adjusted under 35 U.S.C. 154(b) by 114 days.

(21) Appl. No.: 16/793,227

(22) Filed: Feb. 18, 2020

(65) Prior Publication Data

US 2020/0180770 A1 Jun. 11, 2020

Related U.S. Application Data

(63) Continuation of application No. 15/222,566, filed on Jul. 28, 2016, now Pat. No. 10,633,097.

(51) Int. Cl.
*B64D 13/00* (2006.01)
*B05B 1/00* (2006.01)
(Continued)

(52) U.S. Cl.
CPC .............. *B64D 13/00* (2013.01); *B05B 1/005* (2013.01); *B05B 1/042* (2013.01); *B60H 1/3407* (2013.01);
(Continued)

(58) Field of Classification Search
CPC ............ B64D 13/00; B64D 2013/0625; B60H 1/3407; B05B 1/005; B05B 1/042
(Continued)

(56) References Cited

U.S. PATENT DOCUMENTS 1,951,269 A 3/1934 Boeckx
2,684,690 A 7/1954 Lee
(Continued)

FOREIGN PATENT DOCUMENTS

CN 203753411 U 8/2014
DE 874 562 4/1953
(Continued)

OTHER PUBLICATIONS

Office Action of the Substantive Examination issued by the Russian Federal Service for Intellectual Property in application No. 2017118517/11(032036) dated Sep. 23, 2020.
(Continued)

*Primary Examiner* — Allen R. B. Schult
(74) *Attorney, Agent, or Firm* — McDonnell Boehnen Hulbert & Berghoff LLP

(57) ABSTRACT

Apparatus and methods for providing a desired volumetric conditioned airflow rate and for reducing noise level, airflow recirculation and airflow separation are disclosed. An example apparatus includes a nozzle housing having a pair of opposing sidewalls and a front and back wall that define an airflow passage. The airflow passage has a centerline extending between the inlet and the outlet and has a plurality of cross-sections taken perpendicular to the centerline that collectively define a smooth contour along a length of the airflow passage. The cross-sections each have a thickness between the front and back wall that is greater at side edges than at the centerline. The thickness of the cross-sections decreases along a length of at least a first portion of the nozzle housing. A width of each of the cross-sections between the sidewalls increases along the length of at least the first portion of the nozzle housing.

20 Claims, 9 Drawing Sheets

(51) Int. Cl.
*B05B 1/04* (2006.01)
*B60H 1/34* (2006.01)
*B64D 13/06* (2006.01)

(52) U.S. Cl.
CPC .................. *B64D 2013/003* (2013.01); *B64D 2013/0625* (2013.01)

(58) Field of Classification Search
USPC .......................................................... 454/76
See application file for complete search history.

(56) References Cited

U.S. PATENT DOCUMENTS

| | | |
|---|---|---|
| 4,142,456 A | 3/1979 | Locker |
| 5,114,382 A | 5/1992 | Steiner |
| 5,567,230 A | 10/1996 | Sinclair |
| 6,776,710 B1 | 8/2004 | Messmer |
| 2009/0320234 A1 | 12/2009 | Stoy |
| 2013/0252530 A1 | 9/2013 | Vander et al. |

FOREIGN PATENT DOCUMENTS

| | | |
|---|---|---|
| DE | 196 23 765 | 12/1997 |
| JP | H11-129744 | 5/1999 |
| JP | 2004-017685 | 1/2004 |
| RU | 2213240 C2 | 9/2003 |
| RU | 2313680 C2 | 12/2007 |
| SU | 338891 A1 | 5/1972 |
| WO | WO 97/47488 | 12/1997 |
| WO | WO 2014/176044 | 10/2014 |

OTHER PUBLICATIONS

Extended European Search Report prepared by the European Patent Office in application No. 17173671.3, dated Nov. 21, 2017.
Notice of Reasons for Rejection issued by the Japanese Patent Office in application No. 2017-136849, dated Nov. 27, 2018.
First Office Action issued by the Chinese Patent Office in application No. 201710622889.0 dated Dec. 20, 2021.

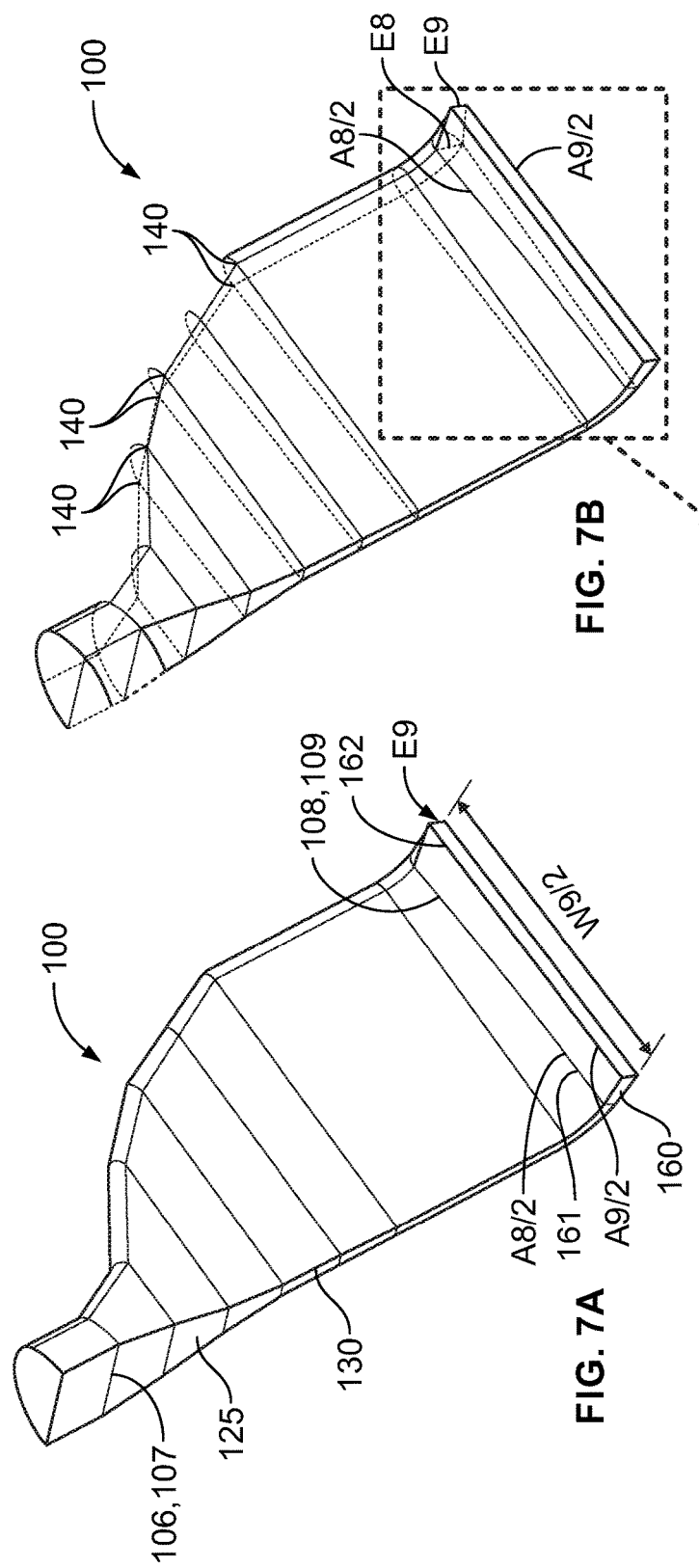

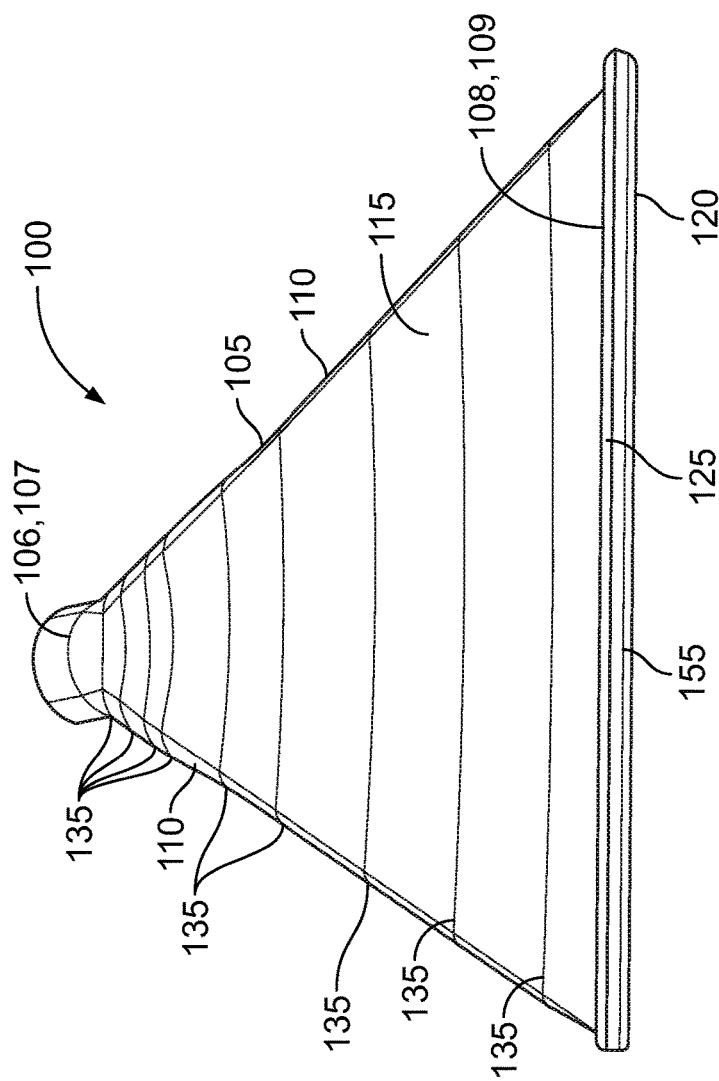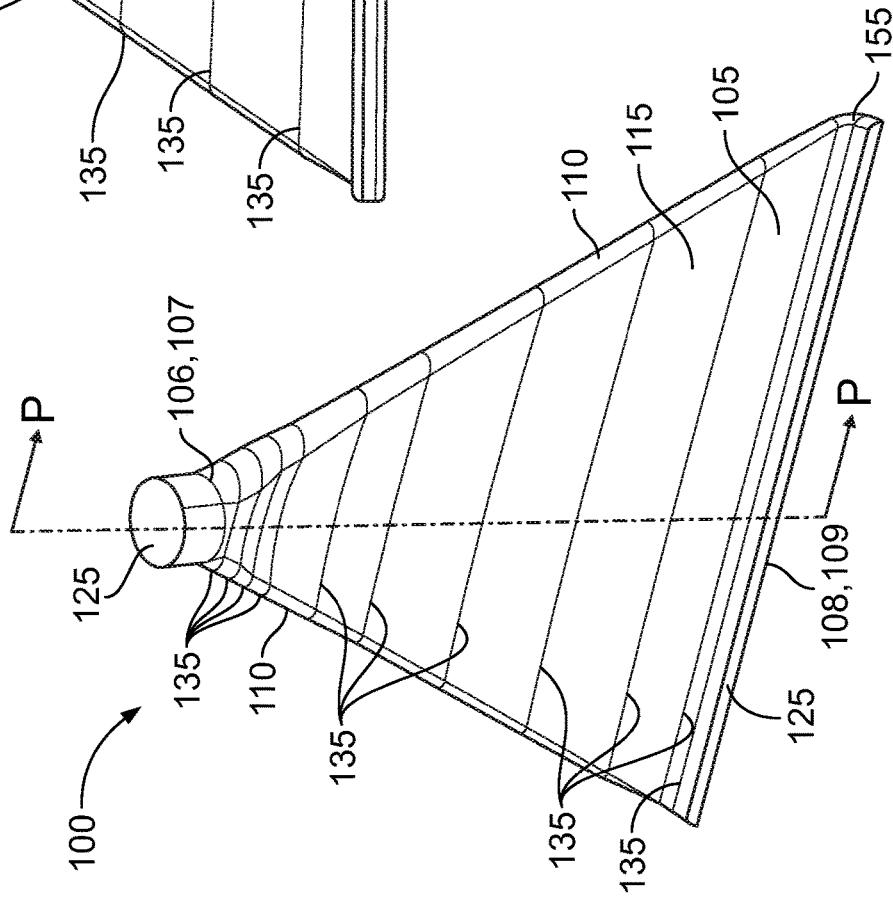

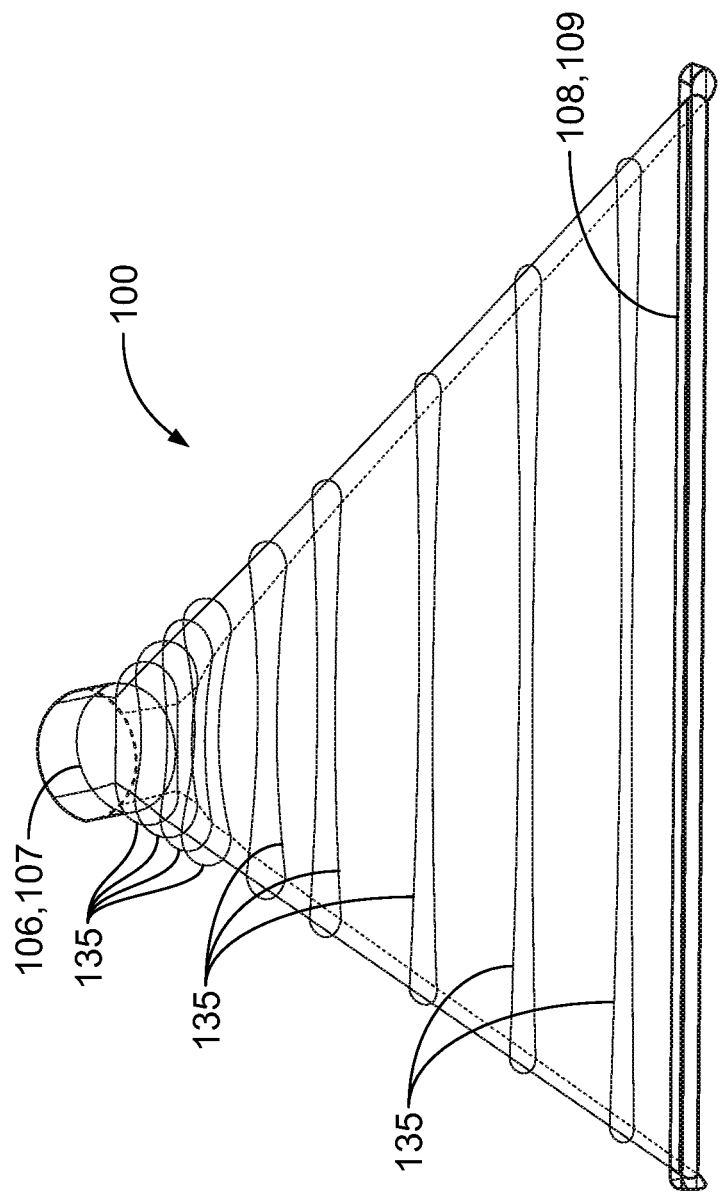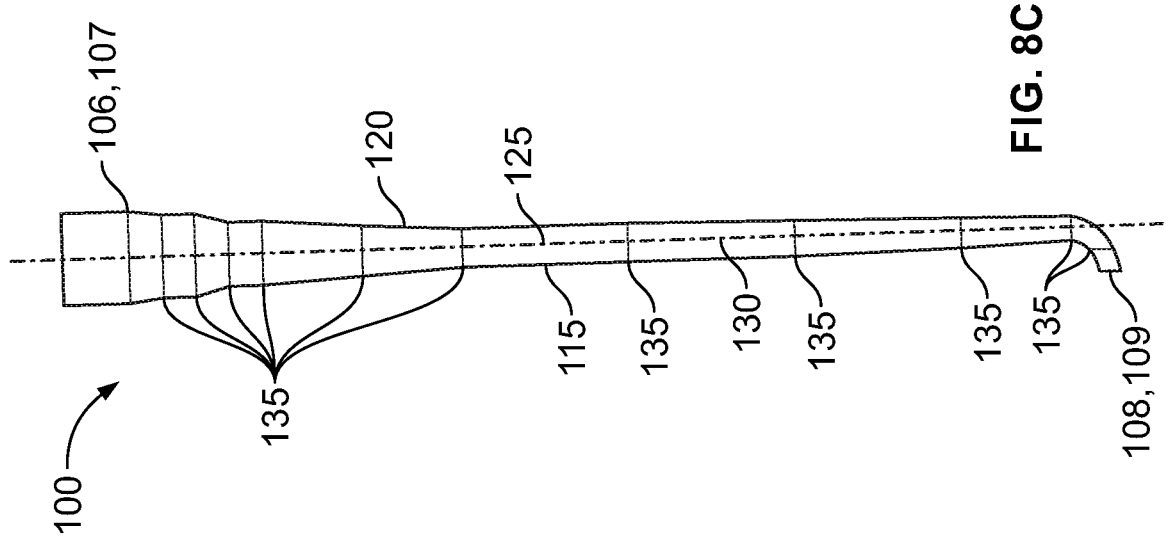
FIG. 8D
FIG. 8C

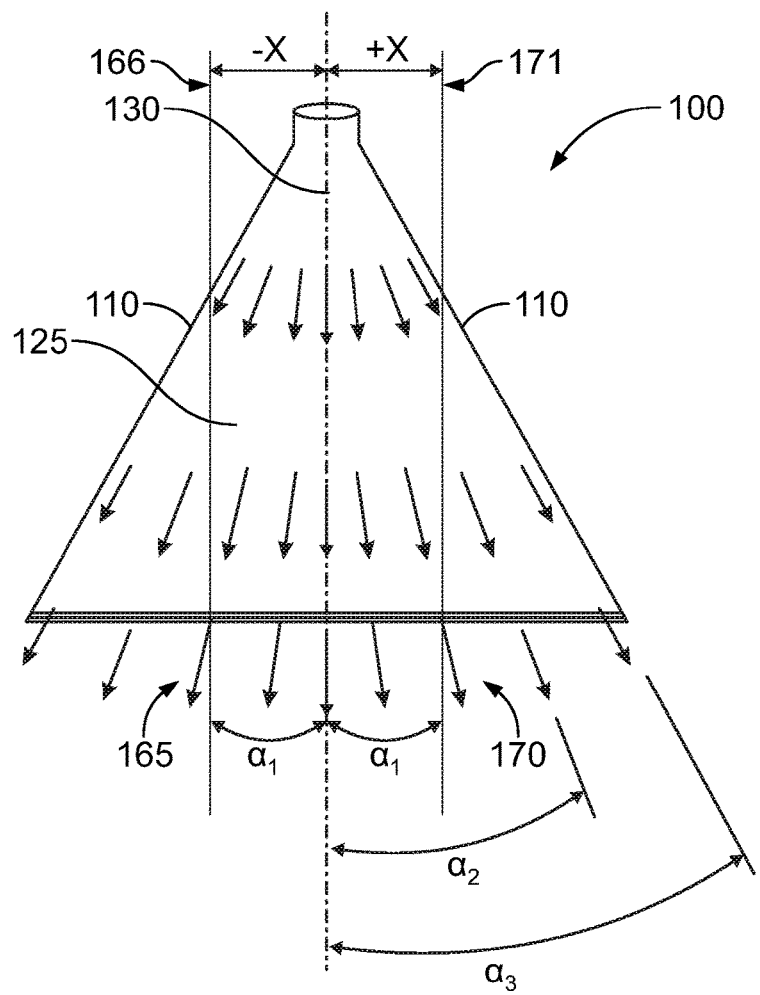

FIG. 9

205
Flowing air through the inlet of the nozzle housing and into the airflow passage.

210
Reshaping a path of the airflow via the plurality of cross-sections that collectively define the smooth contour of the airflow passage from the inlet to the outlet of the nozzle housing and thereby modifying a velocity distribution of the airflow from the inlet to the outlet of the nozzle housing.

FIG. 11

THREE DIMENSIONAL PINCHED AIRFLOW NOZZLE AND METHODS FOR USE THEREOF

CROSS-REFERENCE TO RELATED APPLICATION

This application claims the benefit of the filing date of U.S. Non-Provisional patent application Ser. No. 15/222,566, filed Jul. 28, 2016, which is hereby incorporated by reference in its entirety.

FIELD

The disclosure generally relates to apparatus and methods for distributing air, and more particularly, to an apparatus that may be incorporated in a vehicle such as an aircraft to provide a desired volumetric conditioned airflow rate along a passenger cabin and to reduce noise level, reduce airflow recirculation and reduce airflow separation downstream of the nozzle inlet.

BACKGROUND

Passenger thermal comfort on an aircraft is dependent on the performance of a cabin air distribution system and the performance of a cabin air supply nozzle. The objective of the air distribution system is to provide the required volumetric conditioned airflow rate along the passenger cabin. And the objective of the cabin nozzles is to provide an adequate airflow pattern across the cabin. The airflow pattern inside the aircraft cabin is characterized by having adequate air velocity at the head level of the seated passengers while providing a uniform temperature distribution across the cabin in order to satisfy passenger thermal comfort. The outlet velocity of the nozzle impacts the cabin airflow pattern. Existing nozzle designs utilize airflow restrictors such as orifices, airflow straighteners and nozzle directional vanes to obtain the desired velocity at the nozzle outlet. These air restrictors and the abrupt changes in the airflow path upstream of nozzle outlet may be sources of noise generation that can be transmitted into the passenger cabin.

SUMMARY

In a first aspect of the disclosure, an apparatus is provided that includes a nozzle housing having an inlet at a first end and an outlet at a second end. The nozzle housing has a pair of opposing sidewalls and has a front wall and a back wall each extending between the pair of opposing sidewalls. The apparatus also includes an airflow passage defined by the pair of opposing sidewalls, the front wall and the back wall. The airflow passage has a centerline extending between the inlet and the outlet and has a plurality of cross-sections taken perpendicular to the centerline that collectively define a smooth contour along a length of the airflow passage. Each of the plurality of cross-sections has a thickness between the front wall and the back wall that is greater at side edges of both the front wall and the back wall than at the centerline. The thickness of each of the plurality of cross-sections both at the side edges of the front wall and the back wall and at the centerline decreases along a length of at least a first portion of the nozzle housing from the inlet toward the outlet. A width of each of the plurality of cross-sections between the pair of opposing sidewalls increases along the length of at least the first portion of the nozzle housing from the inlet toward the outlet.

A second aspect is directed to a method for using the apparatus of the first aspect of the invention. One method includes flowing air through the inlet of the nozzle housing and into the airflow passage. The method also includes reshaping a path of the airflow via the plurality of cross-sections that collectively define the smooth contour of the airflow passage from the inlet to the outlet of the nozzle housing and thereby modifying a velocity distribution of the airflow from the inlet to the outlet of the nozzle housing.

The features, functions, and advantages that have been discussed can be achieved independently in various examples or may be combined in yet other examples, further details of which can be seen with reference to the following description and drawings.

BRIEF DESCRIPTION OF THE DRAWINGS

Presently preferred examples are described below in conjunction with the appended figures, wherein like reference numerals refer to like elements in the various figures, and wherein:

FIG. 7A is a diagrammatic representation of a cross-sectional perspective view taken along a center line of an apparatus, according to a fifth example embodiment, showing a nozzle extension;

FIG. 7B is a diagrammatic representation of a cross-sectional perspective view taken along a center line of an apparatus, according to the embodiment of FIG. 7A, showing a plurality of cross-sections and a tangential outline of the apparatus and nozzle extension;

FIG. 7C is a diagrammatic representation showing a detail view of the apparatus and nozzle extension of the region outlined in FIG. 7B;

FIG. 8A is a diagrammatic representation of a front perspective view of an apparatus, according to a sixth example embodiment;

FIG. 8B is a diagrammatic representation of a bottom perspective view of an apparatus, according to the embodiment of FIG. 8A;

FIG. 8C is a diagrammatic representation of a side cross-sectional view of a plurality of cross-sections of an apparatus, according to the embodiment of FIG. 8A;

FIG. 8D is a diagrammatic representation of a bottom perspective view of a plurality of cross-sections and a tangential outline of an apparatus, according to the embodiment of FIG. 8A;

FIG. 9 is a diagrammatic representation of a front view of an apparatus, according to the embodiment of FIG. 8A, showing an airflow pattern in the apparatus;

FIG. 11 is a flow diagram of an example method for using the apparatus.

Corresponding parts are marked with the same reference symbols in all figures.

Figure 1:
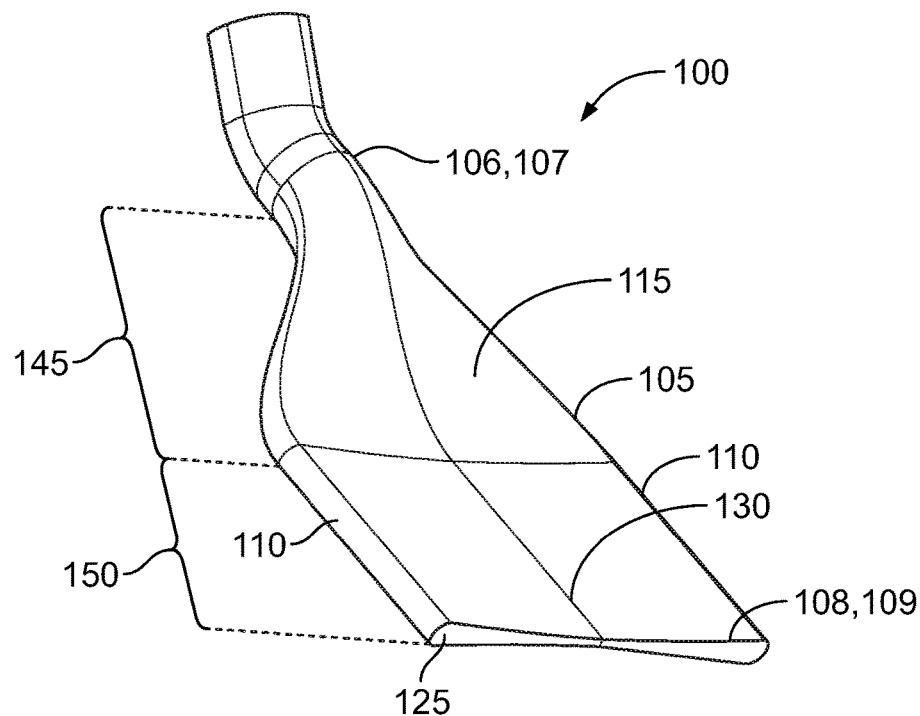
FIG. 1 is a diagrammatic representation of a perspective view of an apparatus, according to one example embodiment.

The drawings are provided for the purpose of illustrating examples, but it is understood that the disclosures are not limited to the arrangements and instrumentalities shown in the drawings.

DETAILED DESCRIPTION

The disclosed examples provide an apparatus and methods for use thereof for providing a desired volumetric conditioned airflow rate along a passenger cabin and for reducing noise level, reducing airflow recirculation and reducing airflow separation downstream of a nozzle inlet, for example. The apparatus may be incorporated in an aircraft as part of an air distribution system, for example.

FIGS. 1-10B depict an apparatus 100 that includes a nozzle housing 105 having an inlet 106 at a first end 107 and an outlet 108 at a second end 109. The nozzle housing 105 has a pair of opposing sidewalls 110 and has a front wall 115 and a back wall 120 each extending between the pair of opposing sidewalls 110. The inlet 106 of the nozzle housing 105 may optionally have a circular shape, for example, that corresponds to the shape of a supply duct or other component of an air distribution system to which the nozzle housing 105 may be coupled. The inlet has a diameter of about 2.5 inches (6.35 cm), but may vary depending on the specific requirements for a given air distribution system. The nozzle housing 105 may have a length extending between the first end 107 and the second end 109 that may range from 8 inches (203.2 mm) to 18 inches (457.2 mm). Nozzles known in the art typically have a length on the order of 8 inches to 10 inches (20.3 cm to 25.4 cm). The additional length achieved by the nozzle housing 105 disclosed herein may advantageously eliminate a portion of the supply duct of the air distribution system that generally weighs more than the nozzle housing 105, thereby reducing the weight of the aircraft payload.

The nozzle housing 105 also includes an airflow passage 125 defined by the pair of opposing sidewalls 110, the front wall 115 and the back wall 120. The airflow passage 125 has a centerline 130 extending between the inlet 106 and the outlet 108 and has a plurality of cross-sections 135 taken perpendicular to the centerline 130 that collectively define a smooth contour along a length of the airflow passage 125.

The nozzle housing 105 may be injection molded in a single unitary piece, for example, to achieve the smooth contour. In alternative embodiments, the nozzle housing may be injection molded in several segments to avoid a mold-lock condition, and these segments may be joined together via ultrasonic welding, laser welding and adhesives, for example. Three Dimensional (3D) printing of the nozzle in one segment or multiple segments may be used to fabricate the desired nozzle housing 105, as well.

Figure 6:
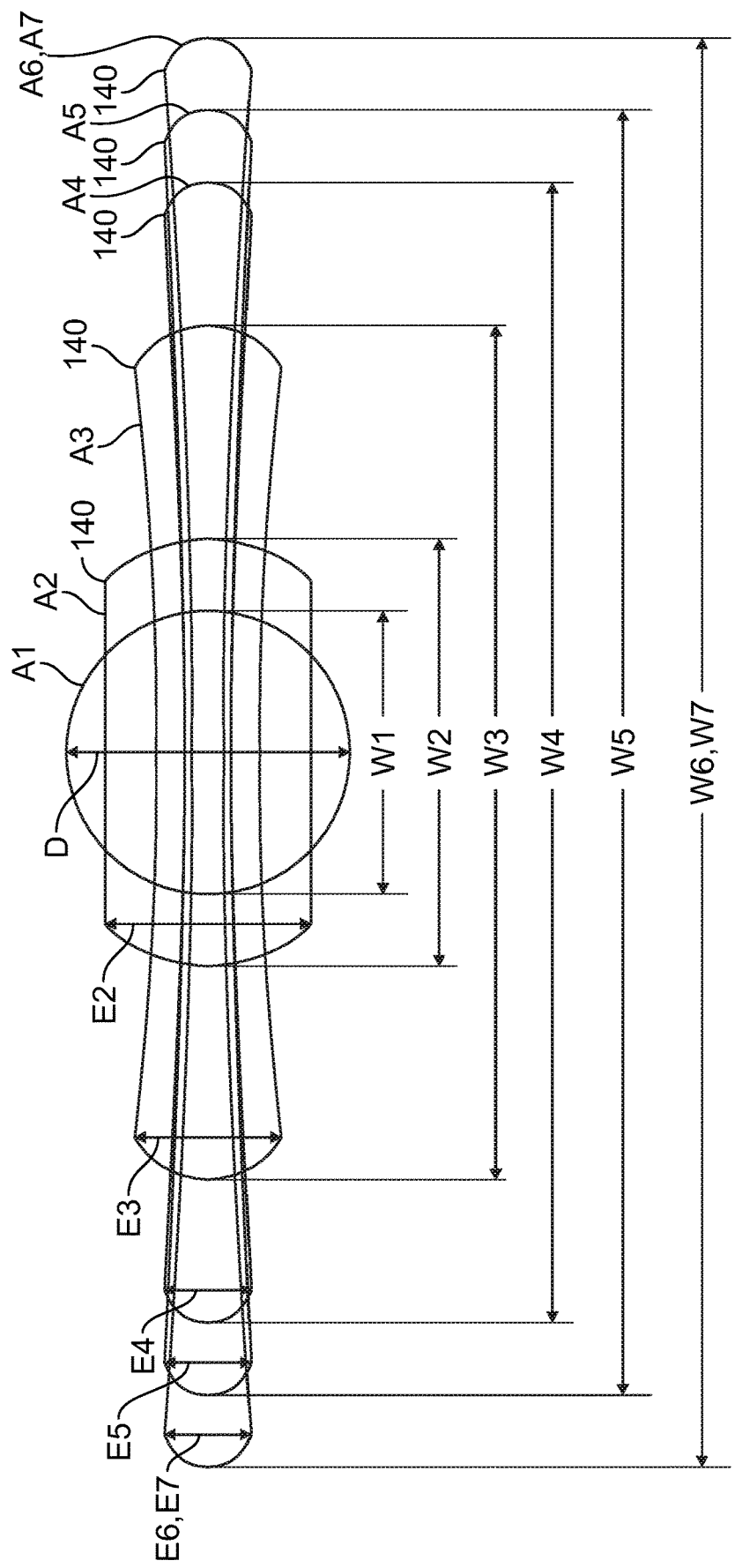
FIG. 6 is a diagrammatic representation of a top view of a plurality of cross-sections of a portion of an apparatus, according to the embodiments of both FIGS. 2 and 3.

Each of the plurality of cross-sections 135 has a thickness E, C between the front wall 115 and the back wall 120 that is greater at side edges 140 of both the front wall 115 and the back wall 120 than at the centerline 130. The thickness E, C of each of the plurality of cross-sections 135 both at the side edges 140 of the front wall 115 and the back wall 120 and at the centerline 130 decreases along a length of at least a first portion 145 of the nozzle housing 105 from the inlet 106 toward the outlet 108. Representative cross-sections 135 are shown in FIGS. 5C and 6 illustrating this arrangement. For example, FIG. 5C shows that the thickness C of the airflow passage 125 at the centerline 130 gradually reduces such that C1>C2>C3>C4>C5>C6 and thickness C6 is the same as thickness C7. And FIG. 6 shows that thickness E of the airflow passage 125 at the side edges 140 of the front wall 115 and the back wall 120 gradually reduces such that E2 is less than the diameter D or thickness of the inlet 106, D>E2>E3>E4>E5>E6 and thickness E6 is the same as thickness E7. The respective areas of each of the cross-sections 135 are shown in FIGS. 5A-5B and 6 as A1 to A7, where area A6 is the same as area A7. The size of the outlet area of the nozzle housing 105 is driven by the desired outlet velocity to satisfy passenger thermal comfort and will vary based on the environment in which the apparatus 100 is intended to be utilized. In addition, a width W of each of the plurality of cross-sections 135 between the pair of opposing sidewalls 110 increases along the length of at least the first portion 145 of the nozzle housing 105 from the inlet 106 toward the outlet 108. The representative cross-sections 135 of FIG. 6 show that the widths of the cross-sections are arranged such that W1<W2<W3<W4<W5<W6 and width W6 is the same as width W7. Such an arrangement gradually reshapes the airflow passage 125 effectively pinching and elongating the cross-sections 135 of the nozzle housing 105 from the inlet 106 to the outlet 108 and thereby reducing airflow recirculation and reducing airflow separation downstream of the inlet 106 in operation.

The inlet 106 may be coupled to a first end 146 of the first portion 145 of the nozzle housing 105 and the outlet 107 may be coupled to a second end 147 of the first portion 145 of the nozzle housing 105. In one example embodiment, shown in FIGS. 1-4, the apparatus 100 may further include a second portion 150 of the nozzle housing 105 coupled to the first portion 145 of the nozzle housing 105. In this embodiment, the inlet 106 is coupled to the first portion 145 of the nozzle housing 105 and the outlet 108 is coupled to the second portion 150 of the nozzle housing 105. As shown in FIGS. 1-3 and 5A-7C, both a shape of the smooth contour and an area of each of the plurality of cross-sections 135 along a length of the second portion 150 of the nozzle housing 105 may optionally remain constant. The front wall 115 and the back wall 120 of the second portion 150 of the nozzle housing 105 may be optionally arranged symmetrically with respect to each other about a plane P-P shown in FIG. 5B, for example. In another embodiment, the second portion 150 of the nozzle housing 105 optionally includes at least one bent segment 155, as illustrated in FIGS. 2, 3. The bent segments 155 may be incorporated to accommodate other infrastructure on the aircraft, thus permitting flexibility in the placement of the apparatus 100 on the aircraft.

Figure 2:
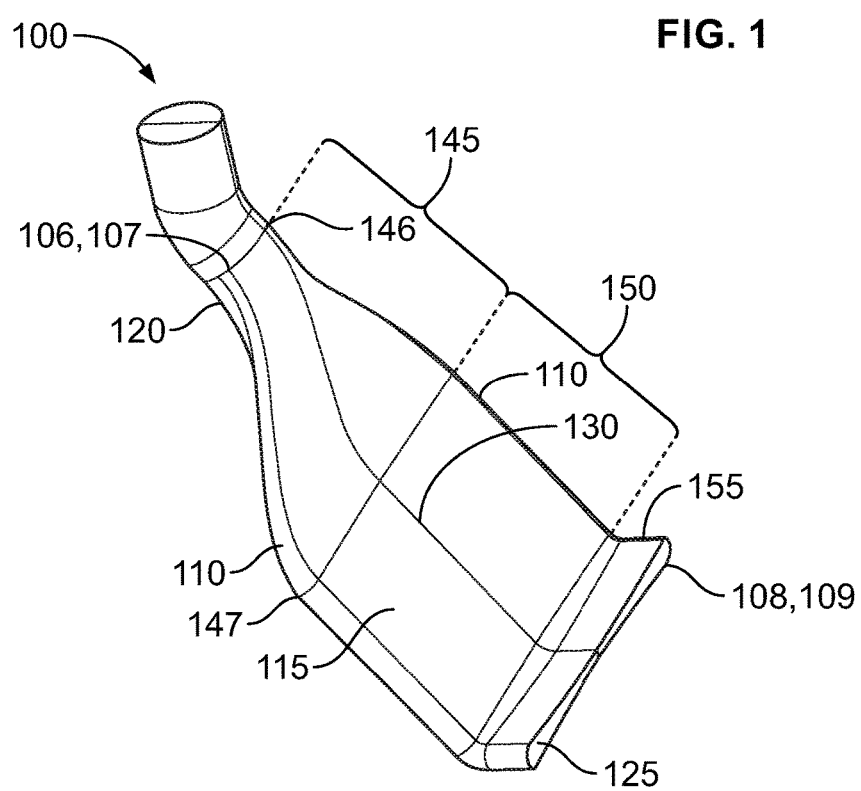
FIG. 2 is a diagrammatic representation of a perspective view of an apparatus, according to a second example embodiment.
Figure 3:
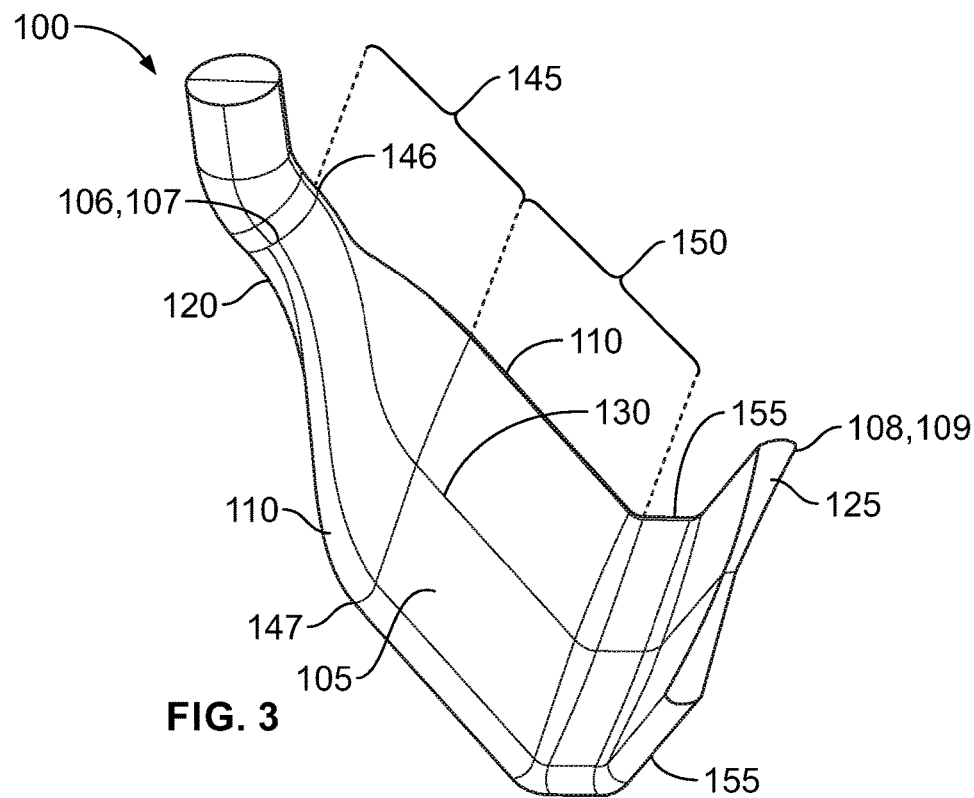
FIG. 3 is a diagrammatic representation of a perspective view of an apparatus, according to a third example embodiment.

In use, the nozzle housings 105 of FIGS. 1-3 have two-dimensional flow patterns at the outlet 108. For example, the same airflow direction will be repeated along any plane taken perpendicular to the cross-section 135 at the nozzle outlet 106. In other words, the direction of the airflow velocity vectors in each plane perpendicular to the cross-section 135 at the nozzle outlet 106 will be parallel to each other. This is the result of the same airflow directions and velocity vectors being repeatable at any cross-section 135 taken along the length of the second portion 150 of the nozzle housing 105 that has a constant width W.

Figure 4:
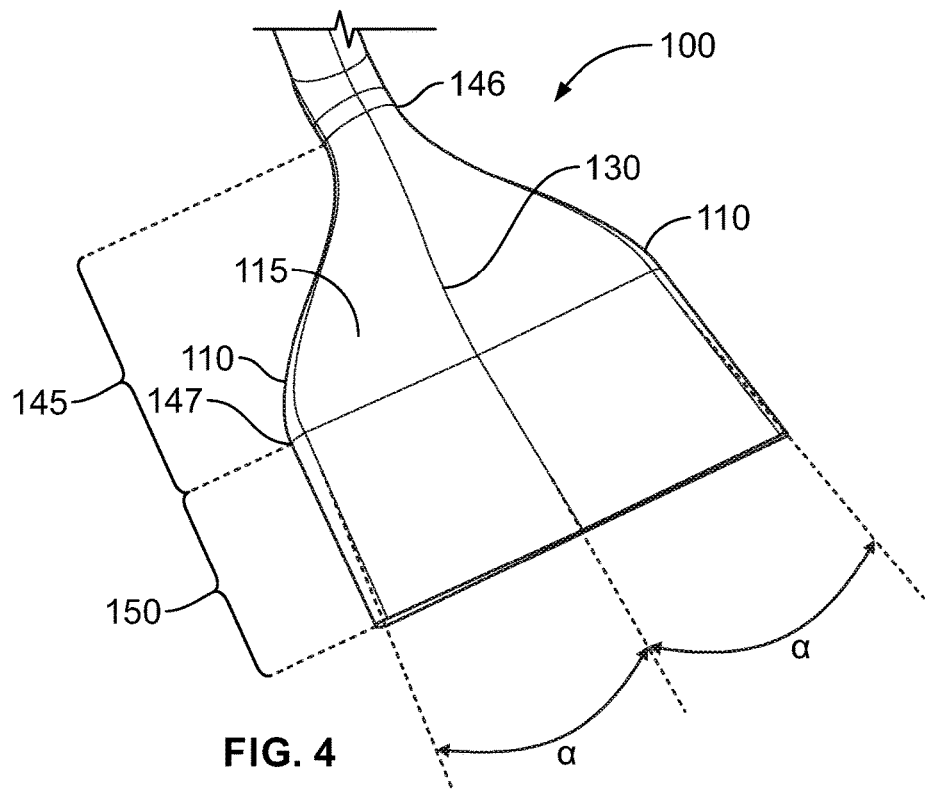
FIG. 4 is a diagrammatic representation of a top view of an apparatus, according to a fourth example embodiment.
Figure 5:
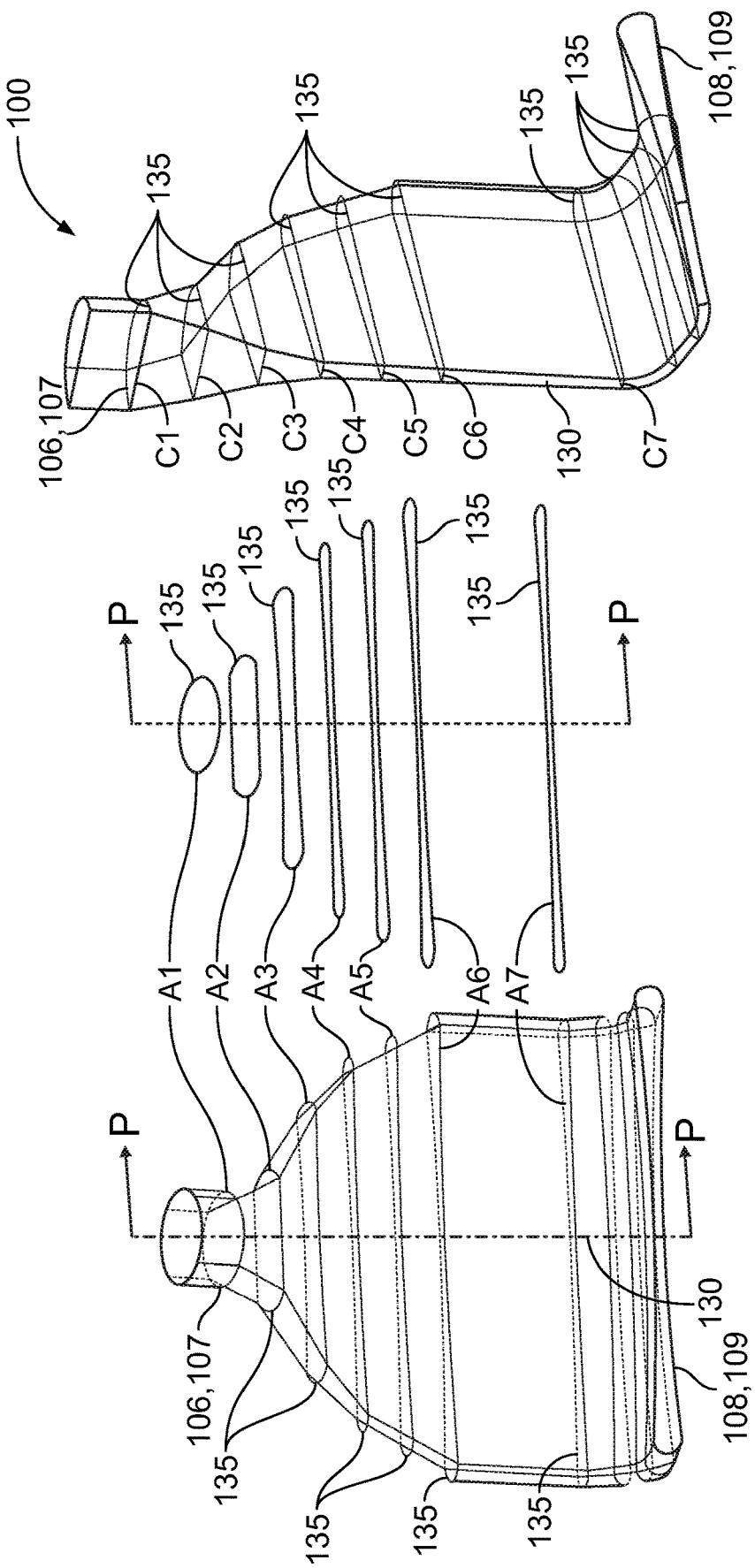
FIG. 5A is a diagrammatic representation of a front perspective view of a plurality of cross-sections and a tangential outline of an apparatus, according to the embodiment of FIG. 2.
FIG. 5B is a diagrammatic representation of a perspective view of a plurality of cross-sections of a portion of an apparatus, according to the embodiments of both FIGS. 2 and 3.
FIG. 5C is a diagrammatic representation of a cross-sectional perspective view taken along a center line of an apparatus, according to the embodiment of FIG. 3, showing a plurality of cross-sections and a tangential outline of the apparatus.

In an alternative embodiment, shown in FIG. 4, the pair of opposing side walls 110 of the second portion 150 of the nozzle housing 105 angle outwardly at an angle $\alpha$ relative to the centerline 130 of the airflow passage 125 from the inlet 106 to the outlet 108 of the nozzle housing 105. The angle $\alpha$ may range from 7 degrees to 30 degrees and is preferably selected to avoid airflow separation from the sidewalls 110, front wall 115 and back wall 120 in the airflow passage 125. For example apparatus 100 that utilize a wider angle $\alpha$, airflow separation can be decreased by restricting the airflow passage 125 by reducing thickness E, C (i.e., the distance between the front wall 115 and the back wall 120) of the nozzle housing 105 thereby reducing the cross-sectional area A. Angle $\alpha$ may be selected based on i) the length of the nozzle housing 105 that may be accommodated by the environment in which apparatus 100 will be used and ii) the width W of the outlet 108 of the nozzle housing needed to achieve the desired outlet velocity for a given application. More specifically, the size of angle $\alpha$ for a given application may decrease as the length of the nozzle housing increases and vice versa. In addition, the larger the value of angle $\alpha$, the stronger the airflow diversion will be at the nozzle outlet, resulting in faster air diffusion inside an aircraft cabin and vice versa. In use, the direction of airflow velocity vectors are different at each cross-section 135 such that the airflow velocity vectors fan outward away from the centerline 130.

Figures 10A, 10B:
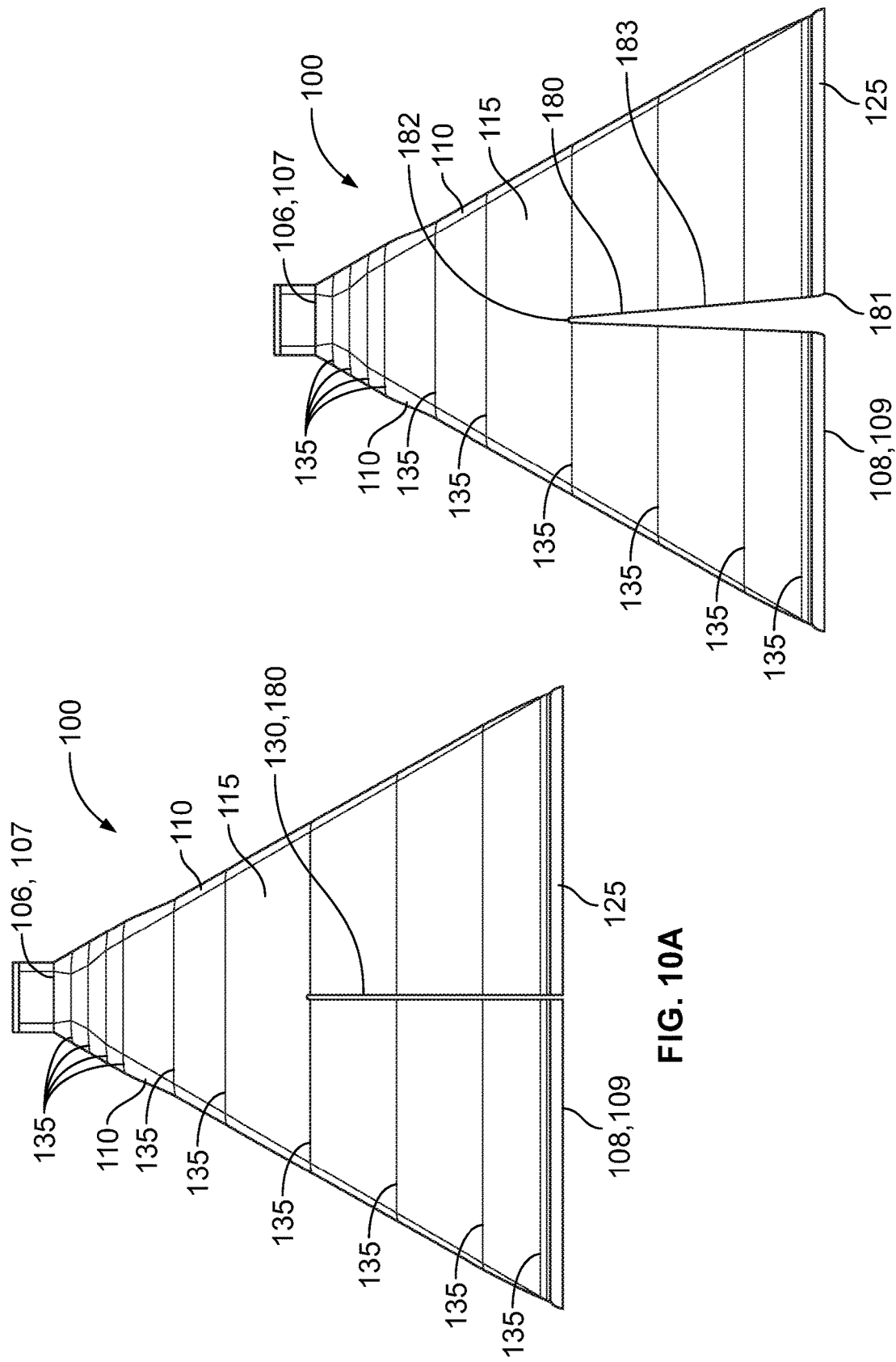
FIG. 10A is a diagrammatic representation of a front view of an apparatus, according to a seventh example embodiment, showing a vane in an airflow passage of the apparatus.
FIG. 10B is a diagrammatic representation of a front view of an apparatus, according to an eighth example embodiment, showing a bifurcation in a nozzle housing of the apparatus.

The cross-section 135 of the outlet 108 of the nozzle housing 105 with a desired velocity and width W may be extended in the direction of airflow to obtain a uniform shape outlet 162 of width W9 and thickness E9/C9. For example, as shown in FIGS. 7A-7C, the apparatus 100 may optionally include a nozzle extension 160 coupled to the outlet 108 of the nozzle housing 105 that defines a portion of the airflow passage 125. The nozzle extension 160 may be formed with the nozzle housing 105 using the same injection molding techniques described above. The nozzle extension 160 has an inlet 161 defining a first area A8 and has an outlet 162 defining a second area A9 that is the same as the first area A8. As illustrated in FIGS. 7A-7C, a cross-section of the apparatus 100 is shown taken along the centerline 130 and as a result only half of area A8 and A9 and width W9 are shown as A8/2, A9/2 W9/2, respectively. The outlet 162 of the nozzle extension 160 may optionally have a rectangular shape. The rectangular shape may have the benefit of providing uniform velocity distribution of the airflow exiting the outlet 162 of the nozzle extension 160. The rectangular shape may also be desirable in certain applications to mate with the shape of vents in the aircraft cabin and for aesthetic purposes, for example. As shown in FIG. 7C, a thickness C8 of the inlet 161 of the nozzle extension 160 at the centerline 130 is less than a thickness C9 of the outlet 162 of the nozzle extension 160. In addition, the thickness E8 of the airflow passage 125 between the front wall 115 and the back wall 120 of the nozzle housing 105 is greater at the side edges 140 of both the front wall 115 and the back wall 120 at the inlet 161 of the nozzle extension 160 than the thickness E9 of the outlet 162 of the nozzle extension 160. And thicknesses C9 and E9 of the airflow passage 125 at the outlet 162 of the nozzle extension 160 are the same.

With respect to the apparatus 100 shown in FIGS. 8A-9, the width W of each of the plurality of cross-sections 135 between the pair of opposing sidewalls 110 increases along the entire length of the nozzle housing 105 from the inlet 106 to the outlet 108, such that the pair of opposing side walls 110 of the nozzle housing 105 angle outwardly at angle $\alpha_3$ relative to the centerline 130 of the airflow passage 125 from the inlet 106 to the outlet 108 of the nozzle housing 105. The front wall 115 and the back wall 120 of the nozzle housing 105 may be arranged symmetrically with respect to each other about a plane P-P. The second end 108 of the nozzle housing 105 may have a bent segment 155.

FIG. 9 shows the three dimensional flow characteristics of the apparatus shown in FIGS. 8A-8D. By angling the opposing sidewalls 110 along the entire length of the nozzle housing 105, the direction of the airflow velocity vectors may increase moving from the centerline 130 toward the opposing sidewalls 110, as shown by highlighted by the direction of the velocity vectors in the regions corresponding to angles $\alpha_1$, $\alpha_2$ and $\alpha_3$. The velocity vectors 165, 170 on opposite sides of the centerline 130 of the nozzle housing 105 have opposite directions. For two planes, plane-a 166 and plane-b 171, that are taken perpendicular to the outlet 108 of the nozzle housing 105 and parallel to each other, vector-a 165 does not lie in plane-a 166 and vector-b 170 does not lie in plane-b 171. In other words, the airflow velocity vectors are not parallel to one another upon exiting the nozzle housing 105. Such an arrangement provides a three dimensional ("3D") airflow pattern at the nozzle outlet 108. A 3D airflow pattern is desired to increase mixing of air and to achieve faster air jet diffusion. In addition, airflow may have a wider distribution zone in the aircraft cabin than the airflow provided by the apparatus of FIGS. 1-3. The apparatus 100 shown in FIGS. 1-3 that generate parallel airflow vectors at the outlet 108, may have a smaller width W at the outlet 108 than the apparatus 100 shown in FIGS. 4 and 9 that have a nozzle housing 105 arranged at angle $\alpha$ relative to the centerline 130. The apparatus of FIGS. 1-3 may be used in applications to deliver a low airflow rate (e.g., on the order of 5 cubic feet per minute). The apparatus of FIGS. 4 and 9 may be used in applications to deliver high airflow rate (e.g., on the order of 25 cubic feet per minute) to increasing mixing of air in a wider area inside the aircraft cabin, for example.

As shown in FIGS. 10A-B, the apparatus may include a vane 180 in the airflow passageway 125 arranged along the centerline 130 at the second end 108 of the nozzle housing 105 extending toward the first end 106 of the nozzle housing 105. A length of the vane 180 may range from ¼ inch (6.35 mm) to 8 inches (203.2 mm) and a thickness of the vane may be on the order of 0.1 inch (2.54 mm). A small vane thickness at the leading edge 182 of the vane 180 helps reduce the airflow disturbance. The vane 180 shown in FIG. 10A provides structural support for the nozzle housing 105 to help maintain the smooth contour of the airflow passage 125 and the gradual change in the nozzle cross-sectional area A within desired tolerances. In addition, a vane 180 would not be needed in an example apparatus 100 that is injection molded to achieve a nozzle housing 105 having sidewalls 110, a front wall 115 and a back wall 120 that are all rigid. The length of the vane 180 is dependent upon the material used to fabricate the nozzle housing 105. The vane 180 shown in FIG. 10A may be coupled to the front wall 115 and to the back wall 120 of the nozzle housing 105. As shown in FIG. 10B, the vane 180 may be wedge-shaped and arranged such that a wider end 181 of the vane 180 is disposed at the second end 108 of the nozzle housing 105 with an apex end or leading edge 182 of the vane 180 extending toward the first end 106 of the nozzle housing 105. In an alternative embodiment, shown in FIG. 10B, the wedge-shape of the vane 180 may be defined by a bifurcation 183 in the nozzle housing 105. The wedge-shaped vane 180 has the technical effect of increasing the flow directionality at the outlet 108 of the nozzle housing 105 to obtain the desired airflow pattern in the aircraft cabin.

FIG. 11 illustrates a method 200 for using the apparatus 100 shown in FIGS. 1-10B. Method 200 includes, at block 205, flowing air through the inlet 106 of the nozzle housing 105 and into the airflow passage 125. And at block 210, a path of the airflow is reshaped via the plurality of cross-sections 135 that collectively define the smooth contour of the airflow passage 125 from the inlet 106 to the outlet 108 of the nozzle housing 105 and a velocity distribution of the airflow from the inlet 106 to the outlet 108 of the nozzle housing 105 is thereby modified.

For the apparatus shown in FIGS. 1-3, the method 200 may include modifying the velocity distribution of the airflow such that each of the plurality of cross-sections of a second portion of the nozzle housing have parallel velocity vectors. Specifically, the apparatus 100 includes the features that (i) the second portion of the nozzle housing coupled to the first portion of the nozzle housing, (ii) the inlet 106 is coupled to the first portion 145 of the nozzle housing 105 and the outlet 108 is coupled to the second portion 150 of the nozzle housing 105, and (iii) both a shape of the smooth contour and an area of each of the plurality of cross-sections 135 along a length of the second portion 150 of the nozzle housing 105 remains constant.

For the apparatus shown in FIGS. 4 and 8A-10B, the method 200 may include modifying the velocity distribution of the airflow such that each of the plurality of cross-sections 135 have different velocity vectors 165, 170 from each other such that the airflow exiting the outlet 108 of the nozzle housing 105 diverges in at least two different directions away from the centerline 130. Specifically, the apparatus 100 includes the features that the width W of each of the plurality of cross-sections 135 between the pair of opposing sidewalls 110 increases along the entire length of the nozzle housing 105 from the inlet 106 to the outlet 108, such that the pair of opposing side walls 110 of the nozzle housing 105 angle outwardly relative to the centerline 130 of the airflow passage 125 from the inlet 106 to the outlet 108 of the nozzle housing 105.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all examples that come within the scope and spirit of the following claims and equivalents thereto are claimed.

What is claimed is:

1. An apparatus, comprising:
    a nozzle housing having an inlet at a first end and an outlet at a second end, wherein the nozzle housing has a pair of opposing sidewalls and has a front wall and a back wall each extending between the pair of opposing sidewalls;
    an airflow passage defined by the pair of opposing sidewalls, the front wall and the back wall, wherein the airflow passage has a centerline extending between the inlet and the outlet and has a plurality of cross-sections taken perpendicular to the centerline that collectively define a smooth contour along a length of the airflow passage, wherein the pair of opposing sidewalls that form the airflow passage are rounded;
    wherein each of the plurality of cross-sections has a thickness between the front wall and the back wall that is greater at side edges of both the front wall and the back wall than at the centerline, wherein the thickness of each of the plurality of cross-sections both at the side edges of the front wall and the back wall and at the centerline decreases along a length of at least a first portion of the nozzle housing from the inlet toward the outlet, wherein a width of each of the plurality of cross-sections between the pair of opposing sidewalls increases along the length of at least the first portion of the nozzle housing from the inlet toward the outlet, and wherein the width of each of the plurality of cross-sections between the pair of opposing sidewalls increases along the entire length of the nozzle housing from the inlet to the outlet, such that the pair of opposing side walls of the nozzle housing angle outwardly relative to the centerline of the airflow passage from the inlet to the outlet of the nozzle housing, and wherein the second end of the nozzle housing has a bent segment, wherein the bent segment is bent to cause an airflow direction in the bent segment to be perpendicular to an airflow direction at the inlet.

2. The apparatus of claim 1, wherein the front wall and the back wall of the nozzle housing are arranged symmetrically with respect to each other about a plane.

3. The apparatus of claim 1, further comprising:
    a vane in the airflow passageway arranged along the centerline at the second end of the nozzle housing extending toward the first end of the nozzle housing.

4. The apparatus of claim 3, wherein a length of the vane ranges from 6.35 mm to 203.2 mm.

5. The apparatus of claim 3, wherein a thickness of the vane is constant along a length of the vane.

6. The apparatus of claim 5, wherein the thickness of the vane is 2.54 mm.

7. The apparatus of claim 3, wherein the vane is coupled to the front wall and to the back wall of the nozzle housing.

8. The apparatus of claim 3, wherein the vane is wedge-shaped and arranged such that a wider end of the vane is disposed at the second end of the nozzle housing with an apex end of the vane extending toward the first end of the nozzle housing.

9. The apparatus of claim 3, wherein the vane is defined by a bifurcation in the nozzle housing.

10. The apparatus of claim 1, wherein the inlet of the nozzle housing has a circular shape.

11. The apparatus of claim 1, wherein a length of the nozzle housing between the first end and the second end ranges from 203.2 mm to 457.2 mm.

12. The apparatus of claim 1, wherein a width of each of the plurality of cross-sections between the pair of opposing sidewalls linearly increases along the length of at least the first portion of the nozzle housing from the inlet toward the outlet.

13. A method for using a nozzle apparatus, comprising:
    providing (a) a nozzle housing having an inlet at a first end and an outlet at a second end, wherein the nozzle housing has a pair of opposing sidewalls and has a front wall and a back wall each extending between the pair of opposing sidewalls, (b) an airflow passage defined by the pair of opposing sidewalls, the front wall and the back wall, wherein the airflow passage has a centerline extending between the inlet and the outlet and has a plurality of cross-sections taken perpendicular to the centerline that collectively define a smooth contour along a length of the airflow passage wherein the pair of opposing sidewalls that form the airflow passage are rounded and (c) wherein each of the plurality of cross-sections has a thickness between the front wall and the back wall that is greater at side edges of both the front wall and the back wall than at the centerline, wherein the thickness of each of the plurality of cross-sections both at the side edges of the front wall and the back wall and at the centerline decreases along a length of at least a first portion of the nozzle housing from the inlet toward the outlet, wherein a width of each of the plurality of cross-sections between the pair of opposing sidewalls increases along the length of at least the first portion of the nozzle housing from the inlet toward the outlet, and wherein the width of each of the plurality of cross-sections between the pair of opposing sidewalls increases along the entire length of the nozzle housing from the inlet to the outlet, such that the pair of opposing side walls of the nozzle housing angle outwardly relative to the centerline of the airflow passage from the inlet to the outlet of the nozzle housing, and wherein the second end of the nozzle housing has a bent segment, wherein the bent segment is bent to cause an airflow direction in the bent segment to be perpendicular to an airflow direction at the inlet;

flowing air through the inlet of the nozzle housing and into the airflow passage; and reshaping a path of the airflow via the plurality of cross-sections that collectively define the smooth contour of the airflow passage from the inlet to the outlet of the nozzle housing and thereby modifying a velocity distribution of the airflow from the inlet to the outlet of the nozzle housing.

14. The method of claim 13, further comprising:

modifying the velocity distribution of the airflow such that each of the plurality of cross-sections have different velocity vectors from each other such that the airflow exiting the outlet of the nozzle housing diverges in at least two different directions away from the centerline.

15. The method of claim 14, wherein modifying the velocity distribution of the airflow causes a three-dimensional airflow pattern at the outlet of the nozzle housing.

16. The method of claim 14, wherein the airflow exiting the outlet of the nozzle housing diverges at least at three different angles relative to the centerline.

17. The method of claim 13, further comprising:

delivering air at the outlet of the nozzle housing at an airflow rate of at least 25 cubic feet per minute.

18. The method of claim 13, further comprising:

adjusting a directionality of the airflow at the outlet of the nozzle housing via a vane in the airflow passageway arranged along the centerline at the second end of the nozzle housing extending toward the first end of the nozzle housing.

19. The method of claim 18, wherein the vane is wedge-shaped and arranged such that a wider end of the vane is disposed at the second end of the nozzle housing with an apex end of the vane extending toward the first end of the nozzle housing.

20. The method of claim 13, wherein the nozzle apparatus further comprises a vane in the airflow passageway arranged along the centerline at the second end of the nozzle housing extending toward the first end of the nozzle housing and wherein a thickness of the vane is constant along a length of the vane, the method further comprising:

providing structural support for the nozzle housing, via the vane, to maintain the smooth contour of the airflow passage.

\* \* \* \* \*